April 9, 1968     R. W. HENNING     3,376,911
FASTENER
Filed May 24, 1966

INVENTOR.
ROBERT W. HENNING
BY H. Samuel Kieser
ATTORNEY

United States Patent Office 3,376,911
Patented Apr. 9, 1968

3,376,911
FASTENER
Robert W. Henning, North Haven, Conn., assignor to Olin Mathieson Chemical Corporation, a corporation of Virginia
Filed May 24, 1966, Ser. No. 552,522
5 Claims. (Cl. 151—41.73)

ABSTRACT OF THE DISCLOSURE

A fastener including a clip for driving into a dry wall, the clip having a first planar portion with an aperture therein and a second integral planar portion disposed at an angle to the first planar portion, the second planar portion having an opening in alignment with the aperture. Screw means are provided for insertion through the aperture, the screw means to be driven through the dry wall and into engagement with the sides of the opening in the second planar portion.

---

This invention relates generally to fasteners and more particularly to fasteners especially adapted to attach a bracket, plate, wood panel or the like to a dry wall.

The use of dry walls in the construction of homes, offices, and other buildings has become quite common. As a result, there is a need for a fastener which can be easily attached to such a wall for the purposes of securing various members thereto. For example, fasteners could be used to attach brackets, wood panels, tracks, corner plates for holding mirrors, and the like.

Therefore, one object of this invention is to provide a fastener especially adapted for use with dry walls. More particularly it is an object of this invention to provide a fastener for attaching brackets to dry walls which is inexpensive to manufacture and easy to install.

These and other objects of the invention may be accomplished through the provision of a spring steel clip member having a first planar portion with an aperture therein and a second planar portion inclined with respect to the first planar portion and having screw gripping fingers therein aligned with the aperture so that an axis extending through the aperture perpendicular to the first planar portion will intersect the midpoint of said screw gripping finger means. Screw means having an elongated tapered portion and an intermediate threaded portion is also provided for insertion through the aperture in the first planar portion whereby the threaded portion engages the screw gripping finger means.

The invention may be more fully understood by reference to the following description of a preferred embodiment and to the accompanying drawings in which.

Figure 1:
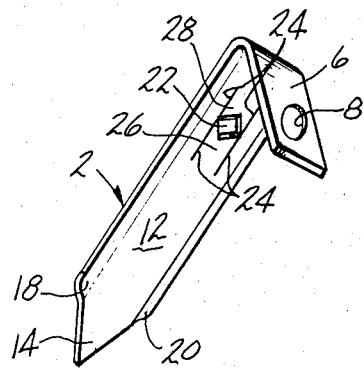
FIGURE 1 is a perspective view of the clip portion of the fastener.
Figure 2:
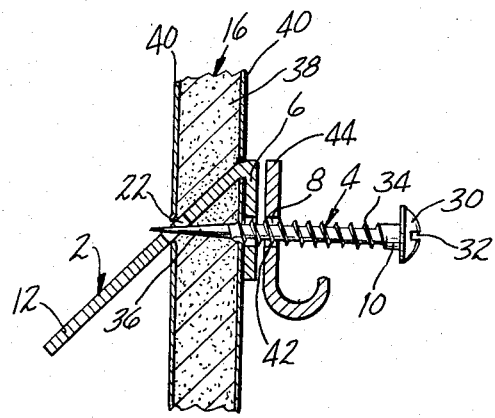
FIGURE 2 is a sectional view showing the clip portion attached to a dry wall and the screw means partially inserted.

Referring to the drawings, the fastener may comprise a clip member 2 and screw means 4. The clip member 2 comprises a first planar portion 6 having an aperture 8 with a diameter at least as great as the diameter of the shank portion 10 of the screw means 4. A second planar portion 12 is bent downwardly from the first planar portion 6 to form an included angle of between 30° and 60°. In the preferred modification, such angle is 45°. The extremity 14 of planar portion 12 is pointed to assist in penetrating the dry wall 16. The side edges of planar portion 12 may be ribbed as indicated at 18 and 20 to increase their resistance to bending. The clip member 2 is made of spring steel and, preferably, has a thickness of between about .020 and .040 inch.

The second planar portion 12 may be provided with a square opening 22 and slits 24 extending from a set of opposite corners thereof in the manner shown in FIGURE 1 to form two oppositely disposed screw engaging fingers 26 and 28 having opposed V-shaped notches in their free end. The opening 22 should be so positioned that the axis of aperture 8, extending perpendicular to the first planar portion 6, passes through the midpoint thereof.

The screw means 4 may comprise a head portion 30 having a slot 32 for the insertion of a screwdriver or a similar tool to impart rotation thereto, a threaded intermediate portion 34, and an elongated tapering portion 36. The tapering portion 36 should be substantially as long as the thickness of the dry wall with which the fastener is to be used.

As is conventional in the art, the dry wall 16 is shown as comprising a plaster composition 38 sandwiched between two sheets of cardboard or other fibrous material 40.

To attach the fastener, the point 14 should be positioned against the side of the dry wall 16 with the clip so positioned that planar portion 6 is substantially parallel thereto. The clip 2 is then hammered into the wall by a suitable instrument with the application of the force being in a direction parallel to the axis of elongation of the second planar portion 12. After the clip is inserted into the dry wall 16 to a point where the inner side of the first planar portion 6 is flush therewith, the screw means 4 may be positioned through an opening 42 in the bracket 44 to be attached, through the aperture 8 in the first planar portion, and driven or pushed through the dry wall 16 until the tapering portion 36 passes through the opening 22 in the second planar portion 12. At this point the screw means 4 may be screwed in the conventional manner until its head portion 30 forces the bracket 44 firmly against the outer surface of the first planar portion 6.

Figure 3:
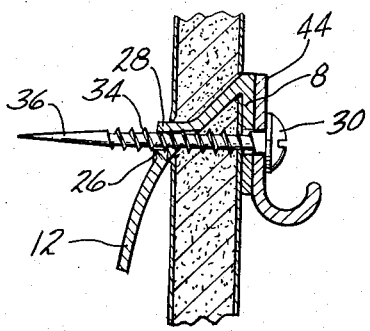
FIGURE 3 is a transverse sectional view of the fastener fully attached to the dry wall and supporting a hook-like bracket member.

The spaced fingers 26 and 28, coacting with the threaded portion 34 on the screw means, prevent withdrawal of the screw means 4. The opening 22 should be smaller than the thickness of the threaded portion 34 of the screw means 4 so that the fingers 26 and 28 are bent upwardly in the manner shown in FIGURE 3.

A fastener constructed in accordance with the above description is capable of supporting a load as great as the static load which the wall itself can support. The high degree of supporting strength is obtained by virtue of the angled relationship between the two planar portions of the clip and the insertion of the screw means perpendicular to the first planar portion. The provision of the elongated tapering portion on the screw means insures that the point will find and pass through the opening in the second planar portion.

It is intended that the foregoing description be considered as exemplary only, and that the scope of the invention be ascertained from the following claims.

What is claimed is:
1. A fastener for attaching members to a dry wall comprising a spring steel clip means having first and second integral planar portions, said first planar portion having an aperture, said second planar portion being bent at an included angle of between 35 and 55° to said first planar portion and terminating in a point, at least one spring finger in said second planar portion terminating in a notch defining one side of an opening therein, said opening being aligned with said aperture such that an axis extending through said aperture perpendicular to said first planar portion intersects the midpoint on said opening, and screw means including an elongated forward tapering portion, an intermediate threaded portion, and a head portion, said screw means adapted to be inserted through said aperture and said opening into a position wherein said threaded portion is engaged by said spring finger.

2. The fastener of claim 1 wherein the thickness of said spring steel clip means is between approximately .020 and .040 inch.

3. The fastener of claim 1 wherein said second planar portion includes a pair of opposed spring fingers terminating in notches defining said opening.

4. A fastener for attaching a member to a dry wall comprising a spring steel clip means having a first planar portion adapted to be positioned flush against said wall and a second planar portion integral wtih said first planar portion and having a pointed free end to be driven into said dry wall, said first planar portion having an aperture, said second planar portion being bent to form an included angle of between 35 and 55° with said first planar portion and having a pair of opposed spring fingers defined by slits and terminating in notches defining an opening therein, said opening being aligned with said aperture such that an axis extending through said aperture perpendicular to said first planar portion intersects the midpoint of said opening, and screw means extending through said member, said aperture, said dry wall and said opening, said screw means being substantially perpendicular to said first planar portion and said dry wall and including an elongated forward tapering portion, an intermediate threaded portion in engagement with said spring fingers, and a head portion engaging said member.

5. A method of attaching a member to a dry wall comprising the steps of; providing spring steel clip means having first and second integral planar portions, said first planar portion having an aperture, said second planar portion being bent to form an included angle of between 35° and 55° with said first planar portion and having a pair of opposed spring fingers terminating in notches defining an opening therein, said opening being aligned with said aperture such that an axis extending through said aperture intersects the midpoint of said opening, and said second planar portion terminating in a point; inserting said second planar portion into said dry wall by applying a force parallel to its axis of elongation until said first planar portion is flush wtih said dry wall; providing screw means having an elongated tapering tip portion, an intermediate threaded portion, and an enlarged head portion; inserting said screw means through said member, through said aperture and through said dry wall until said elongated tip portion passes through said opening such that said screw means is substantially perpendicular to said first planar portion and said dry wall; and driving said screw means until said member is drawn tightly against said first planar portion.

References Cited

UNITED STATES PATENTS

| | | | |
|---|---|---|---|
| 2,103,833 | 12/1937 | Tinnerman | 151—41.75 |
| 2,115,312 | 4/1938 | Lombard | 151—41.75 |
| 2,390,750 | 12/1945 | Tinnerman | 151—41.75 |
| 2,464,295 | 3/1949 | Edgar | 248—217 |
| 2,940,712 | 6/1960 | Lloyd-Young | 248—205 |

EDWARD C. ALLEN, *Primary Examiner.*